Patented Nov. 23, 1943

2,335,059

UNITED STATES PATENT OFFICE 2,335,059

PROCESS OF VULCANIZING RUBBER AND PRODUCT OBTAINED THEREBY

Marion W. Harman, Nitro, W. Va., assignor to Monsanto Chemical Company, St. Louis, Mo., a corporation of Delaware No Drawing. Application February 17, 1940, Serial No. 319,499

16 Claims. (Cl. 260—787)

The present invention relates to a new class of rubber vulcanization accelerators and to the vulcanization of rubber by an improved process wherein there is employed a preferred class of compounds in the vulcanization process and to the vulcanized rubber products so obtained.

This invention comprises the use of tertiary cyclohexylamine salts in the vulcanization process and is a continuation in part of my co-pending application, Serial No. 198,112, filed March 25, 1938, now U. S. 2,223,446. The new accelerators have been found to accelerate the vulcanization of rubber but it is preferred to employ them in conjunction with other organic accelerators, particularly thiazole accelerators whereby rubber products exhibiting improved properties are obtained.

As examples of tertiary cyclohexylamine salts of this invention there may be mentioned dimethyl cyclohexylamine oleate, dimethyl methyl cyclohexylamine oleate, dimethyl cyclohexylamine stearate, dimethyl cyclohexylamine palmitate, dimethyl cyclohexylamine myristate and dimethyl cyclohexylamine naphthenate but preferably salts of aromatic carboxylic acids as for example dimethyl cyclohexylamine benzoate, dimethyl cyclohexylamine salicylate, diethyl cyclohexylamine benzoate, dimethyl cyclohexylamine phthalate and di(dimethyl cyclohexylamine) phthalate. This last mentioned compound has been found to be particularly efficacious due to its nondiscoloring of the cured rubber products and further, although activating thiazole accelerators to a surprising degree has little tendency to scorch or pre-vulcanize the rubber during processing.

Salts of the class exemplified above are readily obtainable by mixing the proper molecular proportions of the amine with the organic acid. Where convenient or desirable, the reaction may be enhanced by the application of heat, the use of solvents and the like. For example 49.8 parts by weight (substantially 0.3 molecular proportion) of phthalic acid were dissolved in alcohol and to the solution so prepared N,N dimethyl cyclohexylamine was added in an amount somewhat in excess of the calculated quantity for forming di(N,N dimethyl cyclohexylamine) phthalate. The temperature of the alcohol solution was maintained at substantially 50–70° during the addition. After completion of the reaction the alcohol was evaporated and the white crystalline residue extracted with petroleum ether to remove the excess of amine leaving the desired di(N,N dimethyl cyclohexylamine) phthalate which melted at 136–139° C.

As exemplary of the preparation of a salt of a fatty acid 70.5 parts by weight of oleic acid (substantially 0.25 molecular proportion) were dissolved in alcohol in a suitable container and heated to refluxing, at which temperature a solution in alcohol of 30.5 parts by weight (substantially 0.25 molecular proportion) of dimethyl cyclohexylamine were added thereto. Heating was continued until the reaction was complete and the solvent then removed leaving the desired salt as a liquid residue.

While specific preparations of the preferred class of materials have been described above, other methods of preparation may be utilized where convenient or desirable. It is to be understood therefore that these preparations are not limitative of the invention but illustrative thereof.

As a specific embodiment of the invention showing the use of the new class of materials as accelerators for the vulcanization of rubber but which again are intended to illustrate the invention and not to limit the same, rubber stocks were compounded comprising—

|  | Stock | |
|---|---|---|
|  | A | B |
|  | Parts by weight | Parts by weight |
| Pale crepe rubber | 100 | 100 |
| Zinc oxide | 10 | 10 |
| Sulfur | 3 | 3 |
| Stearic acid | 0.5 | 0.5 |
| Di(N,N dimethyl cyclohexylamine) phthalate | 0.75 | 0.75 |

The rubber stocks so compounded were vulcanized at the temperature of thirty pounds of steam pressure per square inch and the following modulus and tensile properties obtained on testing the cured rubber products:

Table I

| Stock | Cure time in minutes | Modulus of elasticity in lbs./in.$^2$ at elongations of— | | Tensile at break, in lbs./in.$^2$ | Ult. elong., per cent |
|---|---|---|---|---|---|
|  |  | 400% | 600% |  |  |
| A | 60 | 90 | 240 | 800 | 960 |
| B | 60 | 425 | 1,416 | 3,100 | 835 |
| A | 90 | 120 | 315 | 1,240 | 990 |
| B | 90 | 430 | 1,340 | 2,750 | 825 |

The above data show the desirable accelerating properties of the preferred class of compounds. It is preferred, however, to employ them in conjunction with other organic accelerators whereby new and improved results in the vulcanization of rubber are obtained. Thus, the new compounds show a desirable activation of other organic accelerators when employed in conjunction therewith and produce vulcanized rubber products possessing excellent modulus and tensile properties but without the disadvantage usually accompanying accelerator activation of scorch or prevulcanization. In addition the salts of the higher fatty acids, for example those containing from ten to twenty carbon atoms in the molecule, exhibit desirable softening of the uncured rubber stocks so that less time and power is consumed in the milling or similar operation. The usual accelerators commonly employed commercially may be used in conjunction with the new compounds of this invention as for example thiazole accelerators such as mercaptobenzothiazole, mercapto phenyl benzothiazole, mercapto naphtha thiazole, mercapto methyl thiazole and mercapto methyl benzothiazole. It is meant to include by the term "mercapto thiazole" accelerators reaction products of mercapto thiazoles as well as the free mercapto thiazole. Further examples are organic base reaction products of mercapto thiazoles exemplified by di(benzothiazyl thiol) dimethyl urea, cyclohexylamino thio benzothiazole, dinitrophenyl benzothiazyl sulfide, benzothiazyl thiol benzoate and methylol thiol benzothiazole. Likewise included are the thiazyl sulfides such as dibenzothiazyl mono sulfide and dibenzothiazyl disulfide. In addition other types of accelerators such as dithiocarbamates and aldehyde amines may be employed, specific examples of which are sodium dimethyl dithiocarbamate, tetra methyl thiuram disulfide, piperidine cyclopentamethylene dithiocarbamate, butylaldehyde-aniline, acetaldehyde-aniline and formaldehyde-aniline.

The following are examples of the preferred embodiment of the invention showing the use of the new compounds in conjunction with thiazole accelerators but are in nowise limitative of the invention.

Rubber stocks were compounded comprising—

|  | Stock | | |
|---|---|---|---|
|  | C | D | E |
|  | Parts by weight | Parts by weight | Parts by weight |
| Pale crepe rubber | 100 | 100 | 100 |
| Zinc oxide | 10 | 10 | 10 |
| Sulfur | 3 | 3 | 3 |
| Stearic acid | 0.5 | 0.5 | 0.5 |
| Mercaptobenzothiazole | 0.75 | 0.75 | 0.75 |
| Di(N,N dimethyl cyclohexylamine) phthalate |  | 0.15 | 0.25 |

The stocks so compounded were vulcanized by heating in a press at the temperature of twenty pounds of steam pressure per square inch and the following modulus and tensile properties obtained upon testing the cured rubber products.

*Table II*

| Stock | Cure time in minutes | Modulus of elasticity in lbs./in.² at elongations of— | | Tensile at break, in lbs./in.² | Ult. elong., per cent |
|---|---|---|---|---|---|
|  |  | 500% | 700% |  |  |
| C | 15 | 130 | 310 | 1,560 | 1,015 |
| D | 15 | 225 | 820 | 2,260 | 900 |
| E | 15 | 310 | 1,120 | 2,650 | 855 |
| C | 30 | 270 | 860 | 2,120 | 870 |
| D | 30 | 455 | 1,790 | 3,390 | 820 |
| E | 30 | 555 | 2,200 | 3,780 | 800 |
| C | 45 | 360 | 1,200 | 2,930 | 865 |
| D | 45 | 625 | 2,520 | 3,880 | 800 |
| E | 45 | 720 | 2,740 | 4,100 | 775 |
| C | 90 | 440 | 1,460 | 3,015 | 825 |
| D | 90 | 725 | 2,790 | 4,000 | 770 |
| E | 90 | 820 | 3,030 | 3,720 | 735 |

The above data show that the addition of a small amount of one of the preferred class of materials to a thiazole accelerator, for example mercaptobenzothiazole, gives a faster curing and a higher modulus and tensile stock.

The following is further exemplary of the preferred embodiment of the invention. Rubber stocks were compounded comprising—

|  | Stock | |
|---|---|---|
|  | F | G |
|  | Parts by weight | Parts by weight |
| Pale crepe rubber | 100 | 100 |
| Sulfur | 3 | 3 |
| Zinc oxide | 5 | 5 |
| Stearic acid | 1 | 1 |
| Di(benzothiazyl thiol) dimethyl urea | 0.6 | 0.6 |
| N,N dimethyl cyclohexylamine oleate | 0.1 |  |
| Di(N,N dimethyl cyclohexylamine) phthalate |  | 0.1 |

The stocks so compounded were vulcanized in a press at the temperature of twenty pounds of steam pressure per square inch and the physical properties of the cured rubber products are given in Table III.

*Table III*

| Stock | Cure time in minutes | Modulus of elasticity in lbs./in.² at elongations of— | | Tensile at break, in lbs./in.² | Ult. elong., percent |
|---|---|---|---|---|---|
|  |  | 500% | 700% |  |  |
| F | 30 | 200 | 670 | 2,000 | 880 |
| G | 30 | 280 | 1,080 | 2,500 | 830 |
| F | 45 | 320 | 1,240 | 2,680 | 805 |
| G | 45 | 405 | 1,760 | 2,975 | 790 |
| F | 60 | 385 | 1,610 | 2,800 | 795 |
| G | 60 | 455 | 2,090 | 3,235 | 780 |
| F | 90 | 525 | 2,160 | 3,250 | 770 |
| G | 90 | 680 | 2,810 | 3,675 | 740 |

The above data show the desirable modulus and tensile properties obtained by the use of a tertiary cyclohexylamine salt of an organic carboxylic acid in conjunction with an organic base reaction product of a mercapto thiazole.

As further specific embodiments of this invention a rubber stock was compounded comprising Stock H; parts by weight
| Pale crepe rubber | 100 |
|---|---|
| Whiting | 60 |
| Zinc oxide | 5 |
| Sulfur | 2 |
| Laurex | 0.25 |
| Cyclohexylamino thio benzothiazole | 0.30 |
| Di(N,N dimethyl cyclohexylamine) phthalate | 0.30 |

The stock so compounded was vulcanized by heating in a press at the temperature of twenty pounds of steam pressure per square inch. The physical properties of the cured rubber products are shown below:

*Table IV*

| Cure time in minutes | Modulus of elasticity in lbs./in.² at elongations of— | | Tensile at break, in lbs./in.² | Ult. elong., per cent |
|---|---|---|---|---|
|  | 300% | 500% |  |  |
| 30 | 250 | 880 | 2,300 | 720 |
| 45 | 420 | 1,420 | 3,125 | 670 |
| 60 | 480 | 1,630 | 3,375 | 660 |

The above data further show the desirable modulus and tensile properties obtained by use of the preferred class of materials in conjunction with organic base reaction products of mercapto thiazoles.

The new and preferred class of materials may be employed with other accelerators than those specifically mentioned. This invention is not restricted to the use of the particular compounds given in the disclosure as examples nor is it restricted to their use in the particular rubber mixes herein described but this invention is limited only by the claims attached hereto as part of the present specification.

What is claimed is:

1. The process of vulcanizing rubber which comprises heating rubber and sulfur in the presence of an N, N dialkyl cyclohexylamine salt of an organic carboxylic acid selected from the group consisting of higher fatty acids containing at least ten carbon atoms and aromatic carboxylic acids.

2. The process of vulcanizing rubber which comprises heating rubber and sulfur in the presence of an N, N dimethyl cyclohexylamine salt of an aromatic carboxylic acid.

3. The processs of vulcanizing rubber which comprises heating rubber and sulfur in the presence of an N, N dimethyl cyclohexylamine salt of phthalic acid.

4. The process of vulcanizing rubber which comprises heating rubber and sulfur in the presence of an N, N dimethyl cyclohexylamine salt of a fatty acid containing at least ten but less than twenty carbon atoms.

5. The process of vulcanizing rubber which comprises heating rubber and sulfur in the presence of an N, N dimethyl cyclohexylamine salt of an aromatic carboxylic acid containing a single benzene nucleus in the presence of an organic accelerator of a different class.

6. The process of vulcanizing rubber which comprises heating rubber and sulfur in the presence of an N, N dialkyl cyclohexylamine salt of an organic carboxylic acid selected from the group consisting of higher fatty acids containing at least ten carbon atoms and aromatic carboxylic acids in the presence of a thiazole accelerator.

7. The process of vulcanizing rubber which comprises heating rubber and sulfur in the presence of di(N, N dimethyl cyclohexylamine) phthalate.

8. The process of vulcanizing rubber which comprises heating rubber and sulfur in the presence of N, N dimethyl cyclohexylamine oleate.

9. The vulcanized rubber product obtained by heating rubber and sulfur in the presence of an N, N dialkyl cyclohexylamine salt of an organic carboxylic acid selected from the group consisting of higher fatty acids containing at least ten carbon atoms and aromatic carboxylic acids.

10. The vulcanized rubber product obtained by heating rubber and sulfur in the presence of an N, N dimethyl cyclohexylamine salt of an aromatic carboxylic acid.

11. The vulcanized rubber product obtained by heating rubber and sulfur in the presence of an N, N dimethyl cyclohexylamine salt of phthalic acid.

12. The vulcanized rubber product obtained by heating rubber and sulfur in the presence of an N, N dimethyl cyclohexylamine salt of a fatty acid containing at least ten but less than twenty carbon atoms.

13. The vulcanized rubber product obtained by heating rubber and sulfur in the presence of an N, N dimethyl cyclohexylamine salt of an aromatic carboxylic acid containing a single benzene nucleus in the presence of an organic accelerator of a different class.

14. The vulcanized rubber product obtained by heating rubber and sulfur in the presence of an N, N dialkyl cyclohexylamine salt of an organic carboxylic acid selected from the group consisting of higher fatty acids containing at least ten carbon atoms and aromatic carboxylic acids in the presence of a thiazole accelerator.

15. The vulcanized rubber product obtained by heating rubber and sulfur in the presence of di(N, N dimethyl cyclohexylamine) phthalate.

16. The vulcanized rubber product obtained by heating rubber and sulfur in the presence of N, N dimethyl cyclohexylamine oleate.

MARION W. HARMAN.